United States Patent [19]

Josselson et al.

[11] Patent Number: 4,550,636

[45] Date of Patent: Nov. 5, 1985

[54] SLICING APPARATUS

[75] Inventors: Marc Josselson, San Diego, Calif.; Doug Henderson, Carrollton, Tex.

[73] Assignee: Ralston Purina Company, St. Louis, Mo.

[21] Appl. No.: 617,009

[22] Filed: Jun. 4, 1984

[51] Int. Cl.[4] .................................................. B23Q 3/00

[52] U.S. Cl. ........................................ 83/743; 83/762; 83/821; 269/87.2; 269/295

[58] Field of Search ...................... 269/87.2, 295, 254; 83/762, 821, 453, 454, 743, 744, 760, 761, 764; 30/289, 114, 290

[56] References Cited

U.S. PATENT DOCUMENTS

| | | | |
|---|---|---|---|
| 1,098,941 | 6/1914 | Collins | 83/762 |
| 2,172,538 | 9/1939 | Katzinger | 83/762 |
| 2,206,154 | 7/1940 | Bixler | 83/762 |
| 2,679,274 | 5/1954 | Criner | 83/454 |
| 3,347,296 | 10/1967 | Rothman | 269/87.2 |

FOREIGN PATENT DOCUMENTS

| | | | |
|---|---|---|---|
| 971764 | 1/1951 | France | 83/821 |

*Primary Examiner*—Frank T. Yost
*Assistant Examiner*—Hien H. Phan
*Attorney, Agent, or Firm*—Virgil B. Hill

[57] ABSTRACT

The present invention relates to an apparatus for the slicing of items or products such as croissants and/or sandwich buns to minimize risk of injury and to assure uniform slicing, even with variations in the dimensions of the product. The apparatus comprises a holder for the item to be sliced on a support stand having a fixed surface and a movable cover. A support member spaced between the fixed surface and movable cover supports the item in alignment with a knife or slicer guide so that a user can slice an item such as a roll or croissant uniformly without risk of injury.

26 Claims, 5 Drawing Figures

SLICING APPARATUS

BACKGROUND OF THE INVENTION

The present invention relates to an apparatus for the slicing of products, especially bakery products such as rolls, sandwich buns and the like.

The hand slicing of bakery products such as rolls or buns for sandwiches is a time consuming and tedious process. It is also very difficult to achieve a uniform cut by hand and if the item to be sliced comprises a relatively delicate bakery product such as a croissant or crescent shaped roll, it is even more difficult to cut these without damage to the shape or appearance of the roll. Furthermore, the hand slicing of items usually entails a certain amount of risk of injury to the user and it would therefore be desirable to have an apparatus in which the user can place the item to be sliced and use a knife or slicer to cut the item into uniform slices without risk of injury.

Different types of equipment have been proposed in which the roll or item to be sliced is held in a fixed position for hand slicing by the user. Most of this equipment includes a channel for accepting a knife or slicer blade to permit the passage of the knife through the roll when it is held or anchored in a fixed position. Such an apparatus provides a means for the consistent and uniform slicing of rolls and other bakery products without risk of injury to the user.

U.S. Pat. No. 4,399,989 for example describes an apparatus in which a roll is held in a fixed position between two plates for slicing. A channel between the two plates is provided for passage of a knife blade through the roll which is held in a fixed position. Movement of one of the plates is achieved by the use of a handle which causes one of the plates to move towards the second plate thereby positioning the roll for cutting by a knife in the provided channel.

U.S. Pat. No. 4,249,445 also describes a food slicing apparatus which includes a cutting board, a pair of laterally spaced side walls with a guide slot for a knife, and two opposing surfaces to brace the item to be sliced in relationship to the guide slot. While these particular types of apparatus do improve the safety factor, they are not totally suitable for certain types of items to be sliced, particularly relatively delicate bakery products such as a croissant.

It is therefore an object of the present invention to provide a slicing apparatus which may be used for bakery goods that provides uniform slicing of the product and provides safety to the user.

It is a still further object of the present invention to provide a slicing apparatus which permits the slicing of relatively delicate bakery products such as croissants or rolls in which the uniform slicing of the roll is achieved without damage of the appearance or shape of the roll.

These and other objects are achieved pursuant to the present invention which is hereinafter described in detail.

SUMMARY OF THE INVENTION

Figure 1:
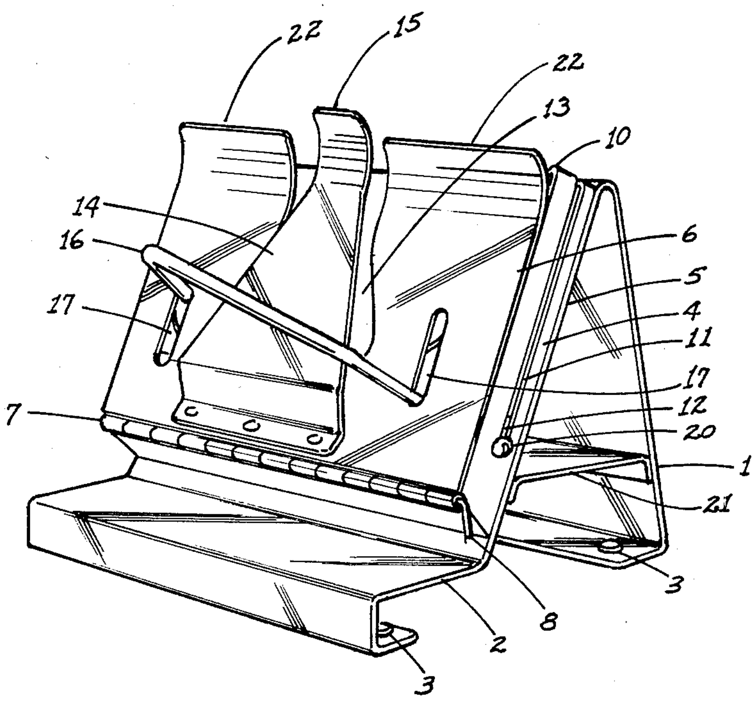
FIG. 1 is an overall perspective view of the slicing apparatus of the present invention.

The present invention involves a slicing apparatus suitable for the uniform slicing of a variety of items but is particularly suited for the slicing of bakery products such as rolls or croissants. The slicing apparatus of the present invention is mounted on a support stand for convenient usage wherein the support stand preferably comprises two adjoining flat stationary plates in a triangular shape and including a suitable base with replaceable non-slip grippers on the bottom of the base to hold the stand firmly in a fixed position on a surface. A holder for the item to be sliced is mounted or adapted to a support stand and comprises two surfaces in which one surface represents a flat stationary plate for receiving one surface of the item to be sliced. Preferably, this flat stationary plate of the holder comprises one of the flat adjoining plates of the support stand. The holder has a second surface which is opposite to the flat stationary plate which is movably connected to the holder, such as by a hinge, in order to provide a movable cover for the holder. When the movable cover is opened, the item to be sliced can be placed in the holder between the flat stationary plate and the movable cover. As the cover is closed, the cover holds the item to be sliced snugly against the stationary plate but without damage to the roll or item to be sliced.

A unique feature of the present invention is a support means for the item to be sliced which is spaced between the first and second surfaces of the holder to support the item to be sliced. The particular shape of the support means is not critical to the practice of the present invention although it typically conforms to the shape of the item to be sliced. If the item to be sliced has a semi-circular shaped portion such as a roll, bagel, or croissant, the support means is usually in the shape of a semi-circle in which a surface of the roll or croissant will abut the support means in order to hold the roll firmly against the stationary plate in alignment with a receiving means for a slicer blade or knife when the movable cover is closed. The support means which is spaced between the first and second surfaces of the holder further includes a receiving means for a slicer blade or knife to be inserted through the support means and thereby substantially slice the item contained in the support means to the extent desired. The receiving means for the slicer blade comprises a channel in the support means having aligned openings which are parallel to the flat stationary plate and closed cover of the holder so that the slicer blade can partially or completely slice the item as desired.

Another unique aspect to the present invention is that the depth of the slice can be controlled by a stop means for the knife blade when the knife is placed in the blade receiving means between the opposing plates of the holder. The stop means comprises several blocks mounted on the horizontally aligned openings of the blade receiving means and are preferably adjustable along at least a portion of the axis of the knife receiving means to permit the depth of the cut through the item to be controlled by adjustment of these blocks. This prevents a complete cut all the way through the product and permits the item upon removal from the apparatus to have a hinged portion which increases usefulness of the sliced item in the production of sandwiches and the like.

Another significant feature of the slicing apparatus of the present invention is represented by the movable cover which preferably has at least a portion thereof cut away to permit the apparatus to accommodate rolls of varying thickness as well as dimensional irregularities, as for example the "crown" of a multi layered roll such as a croissant. Furthermore, adjacent to and overlying the cut away portion of the movable cover is a deflectable plate which is responsive to finger or thumb pressure. This permits pressure to be asserted by the operator by manual means against the top of the item to be sliced when it is in the holder and thereby hold it firmly for slicing. Also, as a preferred but non-limiting embodiment of the present invention, the movable cover can contain an adjustable handle which can accommodate the user insofar as holding of the movable cover against the item to be sliced, and which provides leverage by the user for thumb or finger activation of the deflectable plate to firmly anchor the roll in the holder for slicing.

DESCRIPTION OF THE PREFERRED EMBODIMENTS

Figure 2:
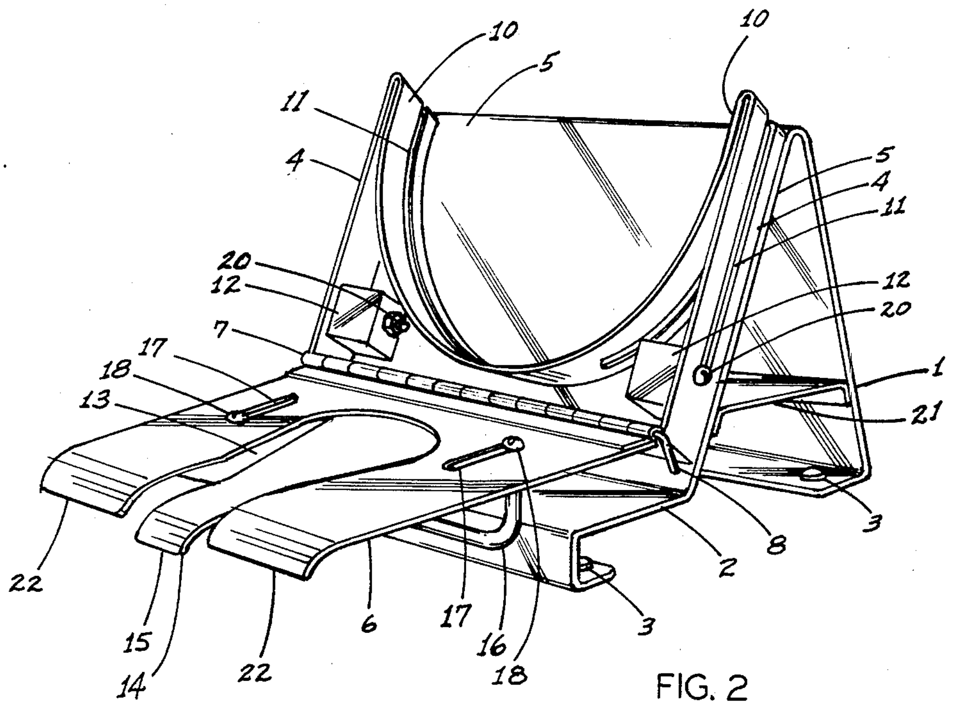
FIG. 2 is a view of the slicing apparatus of the present invention with a movable cover of the apparatus being in an opened position.
Figure 3:
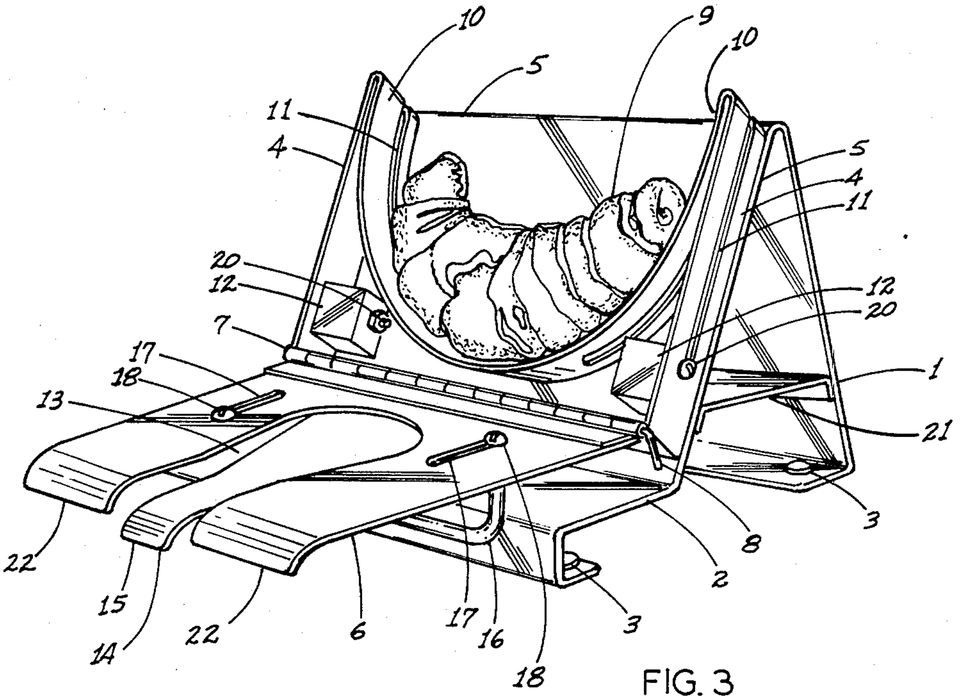
FIG. 3 is a view of the slicing apparatus of the present invention with a movable cover of the apparatus being in an opened position and which includes a croissant placed therein for slicing.

Referring now to FIGS. 1 through 3, there is generally shown the slicing apparatus of the present invention. The slicing apparatus generally comprises a support stand 1, which is preferably constructed of two adjoining flat stationary plates in a triangular shape or an A-shaped configuration with a support plate 21 between the two stationary plates which has a suitable base 2 for maintaining the apparatus in an upright position. The base 2 includes a number of replaceable, nonslippable grippers 3 constructed of rubber or similar material to hold the stand firmly in a fixed position on a table surface. A hilder 4 for the item to be placed is adapted to the support stand 1 and comprises two separate surfaces in which one surface is a flat stationary plate 5 which receives one surface of the item to be sliced. Preferably, the stationary plate 5 will be one of the two adjoining plates in a triangular shape which comprises the support stand 1. This "A" shaped or triangular shaped configuration, in which the stationary plate 5 is one of the adjoining plates of the support stand has an additional advantage in that the holder 4 is maintained at an oblique angle to the surface on which the apparatus is place. Maintaining the holder 4 at an oblique angle to the surface on which the apparatus is placed also facilitates usage of the apparatus by the operator in that the holder 4 is placed at a better visual angle for passage of a knife through the knife or blade receiving means. The holder 4 specifically has a second surface 6, spaced apart from and opposite to the flat stationary plate 5, said surface being movably connected to the holder 4 such as by a hinge 7 to provide a movable cover 6 for the item holder 4. It is preferred, although not critical that the hinge 7 be removable or separable such as by the removal of a pin 8, to permit complete separation of the movable cover 6 for cleaning.

When the movable cover is opened as specifically illustrated in FIGS. 2 and 3, the item to be sliced, such as a croissant or roll 9 is placed in the holder 4 in the space provided between the flat stationary plate 5 and the movable cover 6. This permits one surface of the roll 9 to be fixed firmly against the plate 5 for slicing when the cover 6 is closed without damage to the top surface of roll 9.

A support means 10 is provided in the holder 4 between the cover 6 and fixed plate 5 for support of the roll during slicing. The particular shape of the support means 10 can vary as desired, although it is preferred that it conform to at least one surface of the item to be sliced. Therefore, a preferred shape for the support means for slicing of most bakery products such as rolls or croissants is to have the support means in the shape of a semi-circle so that the rounded edge of the roll 9 will contact the support means 10. The support means 10 holds the roll 9 in alignment with a receiving means 11 for a slicer blade or knife. The receiving means 11 for the slicer blade comprises aligned openings or channels in the support means 10 and holder 4 which are parallel to the stationary plate 5 as well as movable cover 6, when the cover is in a closed position. The holder and support means maintains at least the edge surfaces of roll 9 in alignment with the blade receiving means 11.

The slicing apparatus of the present invention also includes a stop means 12 which controls the depth of a slice that is made when a blade is passed through the blade receiving means 11. The stop means 12 comprises several plastic or wooden blocks which are slidably mounted with screws 20 in the receiving means 11, thereby being movable or slidable along a portion of the axis of the horizontally aligned openings of the knife receiving means 11. The blocks 12 will contact a blade passing through the aligned openings of the receiving means 11 to restrict the depth to which it will slice a roll 9 contained in the holder 4. This is a highly desirable feature, since it is preferable that the roll 9 not be completely sliced if it is to be used for a sandwich since a small portion of the adjoining slices will still be connected for sandwich preparation.

Another unique feature of the slicing apparatus of the present invention is that the item to be sliced can be maintained in a fixed position in the holder 4 and the degree of pressure which is applied to hold or anchor the roll in the holder 4 for slicing is for the most part within manual control of the user who can apply or release pressure by manual means depending on the size of the roll and without damage to the roll. This is provided for in the present invention by several significant modifications to the movable cover 6.

The movable cover 6 includes a cutaway portion 13 which allows rolls of varying thickness, as is normally encountered with croissants, to be placed in the holder 4 between the cover 6 and stationary plate 5 for slicing without damage to the croissant. Furthermore, mounted to the outside face of the movable cover 6 and overlying the cutaway portion 13 of the movable cover is a deflectable plate 14 which is deflectable responsive to finger or thumb pressure thereby permitting the operator to apply manual pressure against the roll 9 in the holder to firmly anchor the roll for slicing.

Preferably, the deflectable plate 14 includes a curled upper portion 15 against which the thumb of the operator may be abutted upon closure of the cover 6 to bend the plate 14 and apply the amount of pressure necessary for firmly anchoring the roll in the holder.

The movable cover 6 also includes an adjustable handle 16 which is movable through the openings 17 on the movable cover 6 along an axis that is parallel to the stationary plate 5 by means of several adjustable screws 18 thereby permitting the operator to grasp the movable cover with his hand to provide leverage and use his thumb to actuate the deflectable plate 14 and therefore firmly hold the movable cover against the top portion of the roll or croissant in the holder 4.

Another preferred, but non-limiting feature of the present invention is for movable cover 6 to have a curled upper edge 22 which generally has the same degree of curl as the upper portion 15 of the deflectable plate 14.

Figure 4:
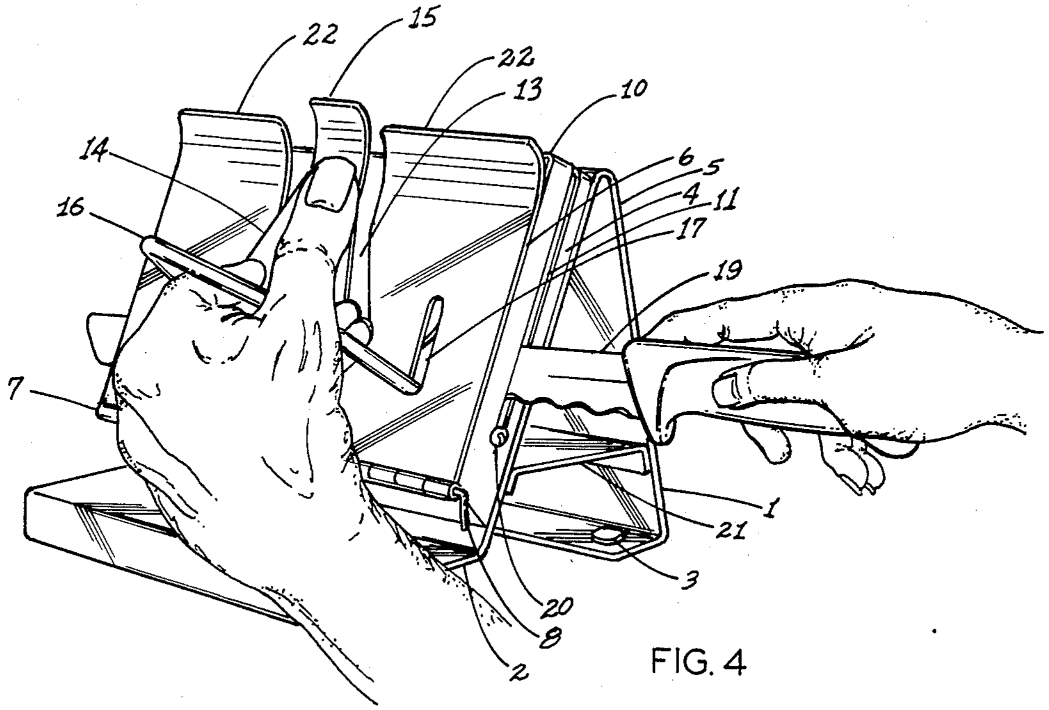
FIG. 4 is a view of the slicing apparatus being used by an operator for the slicing of a croissant.

Use of the slicing apparatus of the present invention in the slicing of croissants is specifically illustrated in FIG. 3 in which a roll or croissant 9 is placed adjacent to the support means 10 and thereby is aligned with the knife or blade receiving means 11 for slicing of the roll. FIG. 4 illustrates the grasping of the movable cover 6 by the operator with the adjustable handle 16 in which the thumb of the operator is in a free position thereby abutting against the deflectable plate 14 and firmly hold the croissant 9 in holder 4 for slicing by a blade 19 through blade receiving means 11.

Figure 5:
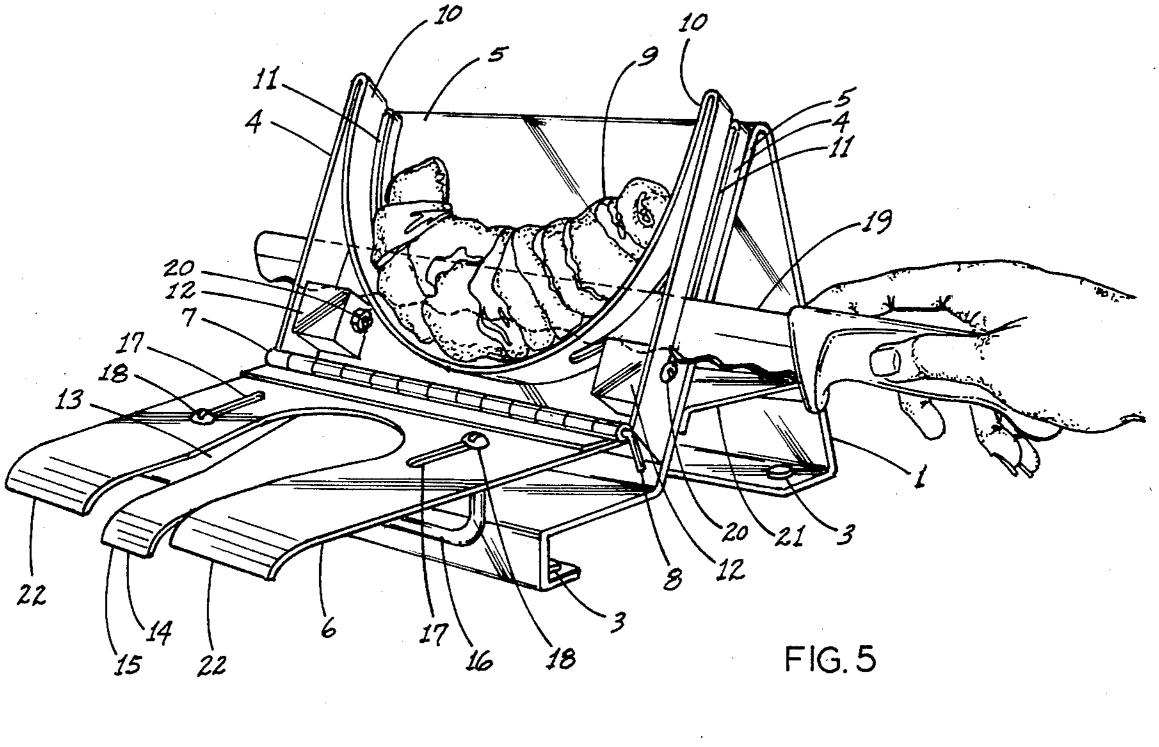
FIG. 5 is a view of the slicing apparatus being used by an operator for the slicing of a croissant in which the cover of the apparatus is opened to show the manner in which slicing of the croissant is carried out.

FIG. 5 specifically illustrates the position of a blade 19 which has sliced the roll 9 and shows the use of the stop means 12 which comprise plastic or wooden blocks to control the depth of the cut. The blade 19 contacts the stop means 12 thereby preventing complete cutting of the croissant and maintaining the two sliced portions of the croissant in a hinged relationship.

While the above invention has been described with regard to a number of specific embodiments, it is hereby intended to include within the scope of the present invention all reasonable modifications and equivalents thereto.

What is claimed is:

1. A slicing apparatus on a support stand comprising:

a. a holder for an item to be sliced connected to said stand, said holder having a first surface which comprises a flat stationary plate for receiving one surface of the item to be sliced, and a second surface spaced opposite to said plate which is movably connected to said holder to provide a movable cover for said holder so as the movable cover is opened, an item to be sliced can be placed in the holder and as the cover is closed, the cover holds the item to be sliced against the stationary plate;

b. a support means based between the first and second surfaces of said holder to support the item to be sliced which includes a slicer blade receiving means for a blade to be inserted through the support means and slice the item, wherein said blade receiving means include a stop means to control the depth of the cut by the blade through the item.

2. The apparatus of claim 1 wherein said support stand maintains said holder at an oblique angle to a surface on which the stand is placed.

3. The apparatus of claim 1 wherein said support stand comprises a triangular shape.

4. The apparatus of claim 3 wherein the flat stationary plate of said holder comprises a portion of the support stand.

5. The apparatus of claim 1 wherein said support means is of a semi-circular shape.

6. The apparatus of claim 1 wherein the stop means comprises slidable blocks mounted on the slicer blade receiving means and slidable along at least a portion of the axis of the knife receiving means.

7. The apparatus of claim 1 wherein said movable cover has at least a portion thereof cut away to permit the holder of said apparatus to accommodate items of varying thickness.

8. The apparatus of claim 7 wherein said movable cover includes a deflectable plate overlying the cut away portion of the movable cover which is deflectable responsive to pressure asserted by an operator.

9. The apparatus of claim 8 wherein said deflectable plate has a curled upper portion against which the thumb of the operator may be abutted upon closure of said movable cover.

10. The apparatus of claim 1 wherein said movable cover includes a handle.

11. The apparatus of claim 10 wherein said handle is adjustable along an axis which is parallel to said flat stationary plate.

12. The apparatus of claim 1 in which said movable cover is movably connected to said holder by a removable hinge.

13. The apparatus of claim 1 wherein said movable cover has a curled upper edge.

14. A slicing apparatus on a support stand comprising:

a. a holder for an item to be sliced connected to said stand, said holder having a first surface which comprises a flat stationary plate for receiving one surface of the item to be sliced, and a second surface spaced opposite to said plate which is movably connected to said holder to provide a movable cover for said holder, so as the movable cover is opened, an item to be sliced can be placed in the holder and as the cover is closed, the cover holds the item to be sliced against the stationary plate;

b. a support means based betwen the first and second surfaces of said holder to support the item to be sliced which includes a slicer blade receiving means in said support means comprising aligned openings in said support means that are parallel to said flat stationary plate which permits a slicer blade to be inserted through the support means and slice the item, wherein said blade receiving means includes a stop means to control the depth of the cut by the blade through the item.

15. The apparatus of claim 14 wherein said support stand maintains the holder at an oblique angle to a surface on which the stand is placed.

16. The apparatus of claim 14 wherein said support stand comprises a triangular shape.

17. The apparatus of claim 16 wherein the flat stationary plate of said holder comprises a portion of the support stand.

18. The apparatus of claim 14 wherein support means is of a semi-circular shape.

19. The apparatus of claim 14 wherein the stop means comprises slidable blocks mounted on the slicer blade receiving means and slidable along at least a portion of the axis of the knife receiving means.

20. The apparatus of claim 14 wherein said movable cover has at least a portion thereof cutaway to permit the holder of said apparatus to accommodate items of varying thickness.

21. The apparatus of claim 20 wherein said movable cover includes a deflectable plate overlying the cutaway portion of the movable cover which is deflectable responsive to pressure asserted by an operator.

22. The apparatus of claim 21 wherein said deflectable plate has a curled upper portion against which the thumb of the operator may be abutted upon closure of the movable cover.

23. The apparatus of claim 14 wherein said movable cover includes a handle.

24. The apparatus of claim 23 wherein said handle is adjustable along an axis which is parallel to said flat stationary plate.

25. The apparatus of claim 14 in which said movable cover is movably connected to said holder by a removable hinge.

26. The apparatus of claim 14 wherein said movable cover has a curled upper edge.

* * * * *